Feb. 10, 1959  R. H. COLLINS  2,872,991
PARKING STRUCTURE FOR AUTOMOTIVE VEHICLES
Filed April 8, 1957  5 Sheets-Sheet 1
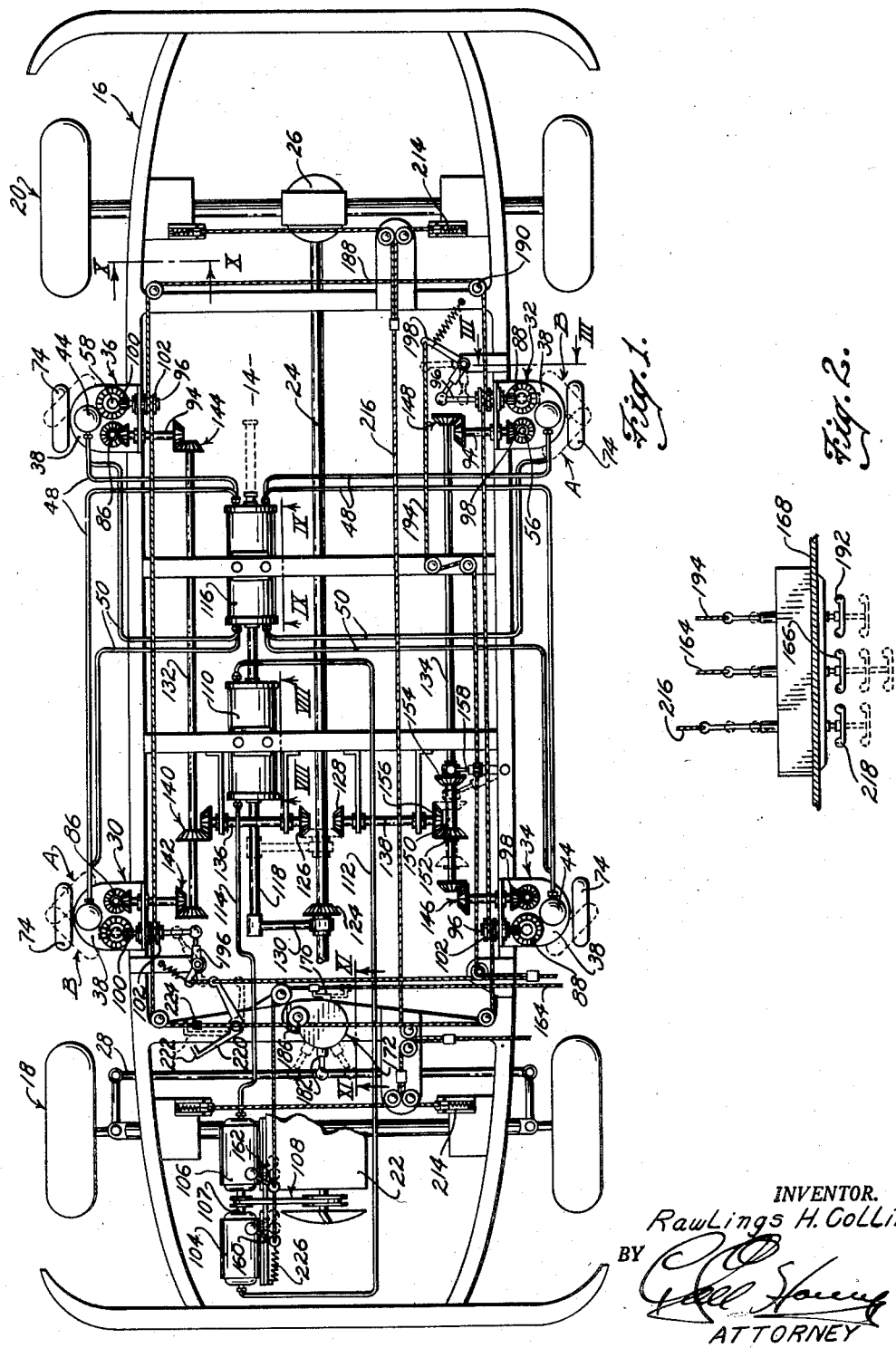
INVENTOR.
Rawlings H. Collins
BY
ATTORNEY

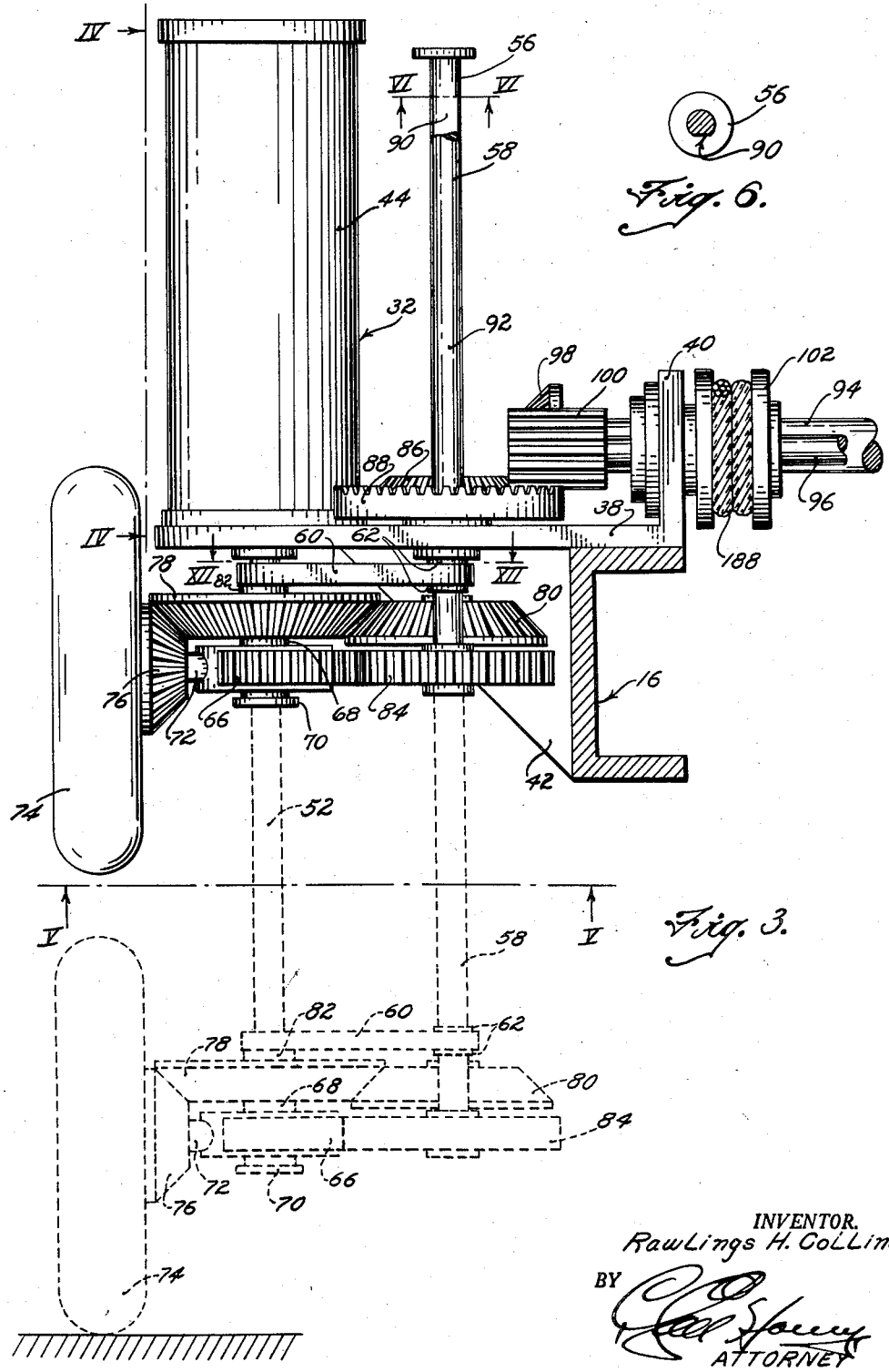

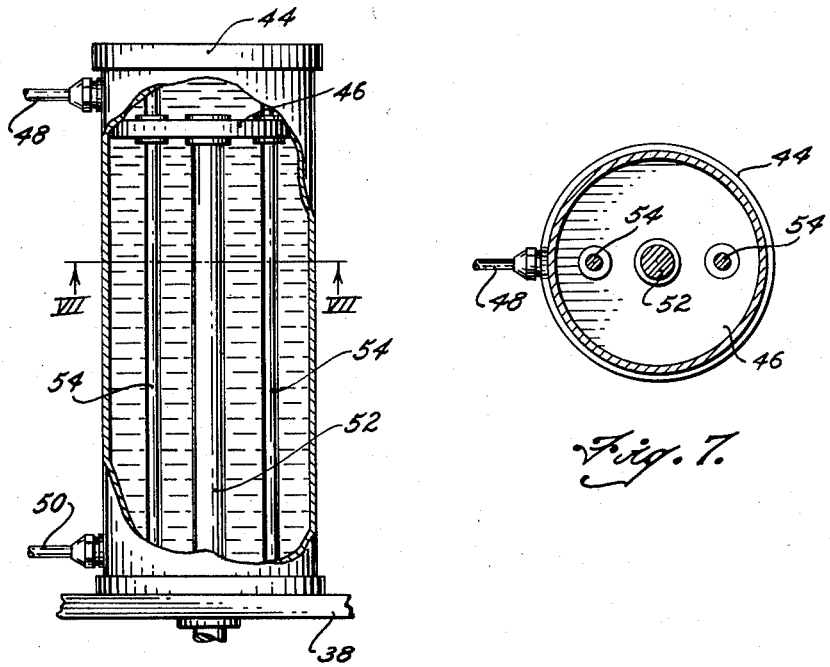
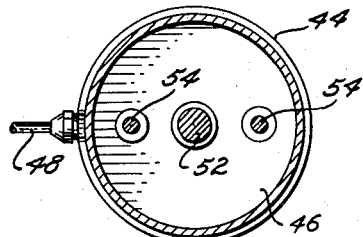
Fig. 7.
Fig. 4.
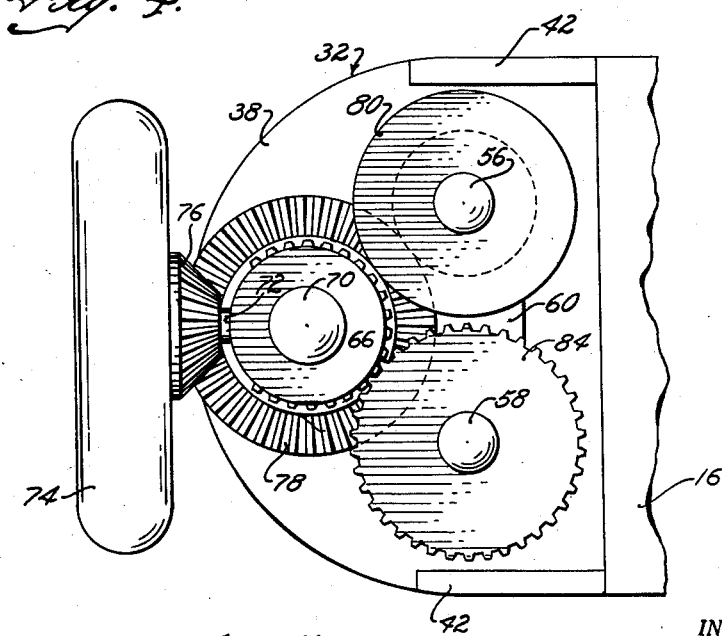
Fig. 5.
INVENTOR.
Rawlings H. Collins
BY
ATTORNEY Feb. 10, 1959  R. H. COLLINS  2,872,991
PARKING STRUCTURE FOR AUTOMOTIVE VEHICLES
Filed April 8, 1957  5 Sheets-Sheet 4

INVENTOR.
Rawlings H. Collins
BY
ATTORNEY

Feb. 10, 1959  R. H. COLLINS  2,872,991
PARKING STRUCTURE FOR AUTOMOTIVE VEHICLES
Filed April 8, 1957  5 Sheets-Sheet 5

INVENTOR.
Rawlings H. Collins
BY
ATTORNEY

United States Patent Office 2,872,991
Patented Feb. 10, 1959

2,872,991
PARKING STRUCTURE FOR AUTOMOTIVE VEHICLES

Rawlings H. Collins, Kansas City, Mo.

Application April 8, 1957, Serial No. 651,333

3 Claims. (Cl. 180—1)

This invention relates to improvements in automotive vehicles, and more particularly to an assembly which may be attached to the chassis of virtually any type of automobile and operated through the steering mechanism thereof, as well as through the engine itself for facilitating parking of the vehicle in confined spaces.

It is the most important object of the present invention to provide a plurality of lifting units shiftable to a position supporting the vehicle independently of the wheel and axle assemblies thereof and driven by the automobile engine to shift the automobile laterally or in a circular path as may be desired through rotation of the steering wheel by the operator.

Another important object of the instant invention is to provide a plurality of hydraulic lifting units for an automobile, which units are in turn wheeled and driven directly from the propeller shaft of the automobile in either of two directions, depending upon the position of the transmission control lever forwardly or in reverse.

Another important object of the present invention is to provide parking instrumentalities of the aforementioned character having control means permitting the operator to automatically couple the lifting units with the steering mechanism of the automobile as the hydraulic system is placed in operation to raise the chassis, whereupon, through operation of the hydraulic system, the wheels of the lifting units are operably coupled with the propeller shaft of the vehicle and the entire assembly thereby made ready for use through control of the engine and the steering wheel.

Still another important object of this invention has to do with the way in which certain of the units may be independently controlled, whereby, in lieu of lateral movement of the vehicle in a plurality of directions, the said vehicle may be completely reversed by revolving the same about a stationary vertical axis.

In the drawings:

Figure 1 is a plan view of the chassis of an automotive vehicle showing the parking structure of the instant invention operably associated therewith.

Fig. 2 is a fragmentary, detailed, cross-sectional view through the instrument panel of the vehicle illustrating the manual controls for the parking structure.

Fig. 3 is an enlarged, fragmentary, cross-sectional view taken on line III—III of Fig. 1.

Fig. 4 is a fragmentary, elevational view taken on line IV—IV of Fig. 3, parts being broken away and in section to reveal details of construction.

Fig. 5 is a fragmentary, bottom view taken along line V—V of Fig. 3.

Fig. 6 is a detailed, cross-sectional view taken on line VI—VI of Fig. 3.

Fig. 7 is a transverse, cross-sectional view taken on line VII—VII of Fig. 4.

Figure 8:
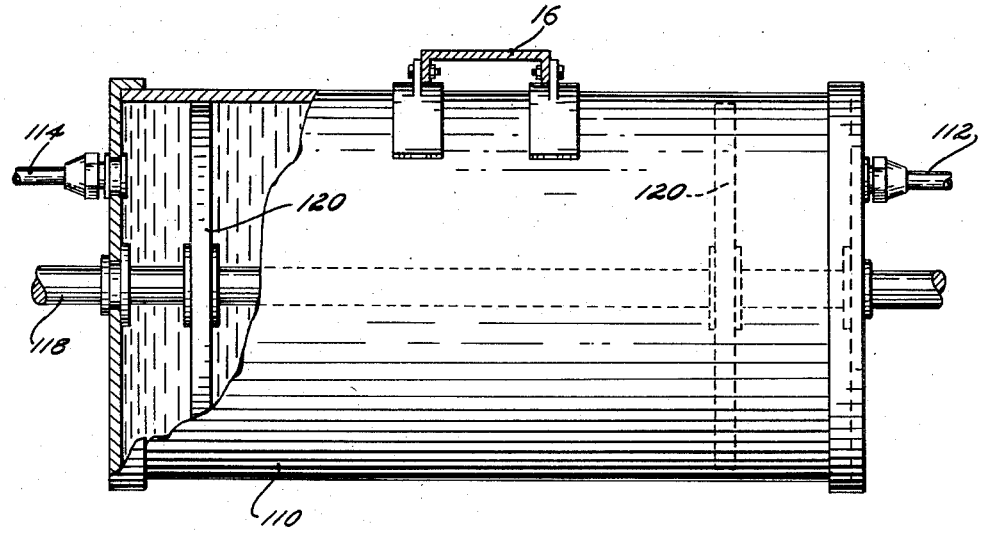
Fig. 8 is an enlarged, elevational view taken on line VIII—VIII of Fig. 1, parts being broken away for clearness.

Chassis 14 of an automotive vehicle illustrated in Figure 1 of the drawings, includes a frame broadly designated by the numeral 16 which is supported in the usual manner by a front wheel and axle assembly 18 and a rear wheel and axle assembly 20. Frame 16 supports an internal combustion engine 22 which drives the rear assembly 20 through propeller shaft 24 operably coupled with differential driving unit 26 of the rear axle. It is conventional also in vehicles of such nature to guide the same by steering mechanism operably coupled with the front assembly 18 having steering linkage that includes a tie rod 28.

The parking structure of the instant invention includes four lifting units designated broadly by the numerals 30, 32, 34 and 36 which are substantially identical except for the fact that the units 30 and 32 include auxiliary parts not provided for in units 34 and 36 as will hereinafter appear. Referring, therefore, to Figs. 3–7 and thus, particularly to unit 32, a suitable supporting plate 38 having an upstanding flange 40 at its innermost edge is welded or otherwise rigidly attached to frame 16 and reinforced by gussets 42.

Plate 38 in turn supports a double-acting fluid piston and cylinder assembly that includes a cylinder 44 rigidly secured to plate 38 and extending upwardly therefrom. A piston 46 (Fig. 4) reciprocable vertically within the cylinder 44, is forced downwardly when hydraulic fluid is directed into the cylinder 44 above piston 46 through line 48 and is forced upwardly when hydraulic fluid is directed into the cylinder 44 below piston 46 via line 50. Piston 46 and its ram 52 is held against rotation with respect to the cylinder 44 through the medium of a plurality of guides 54 rigid to the cylinder 44 therewithin and along which the piston 46 slides.

Figure 12:
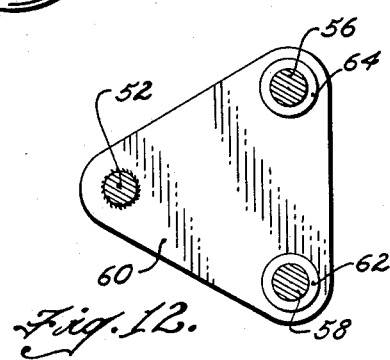
Fig. 12 is a fragmentary, detailed, cross-sectional view taken on line XII—XII of Fig. 3.

Manifestly, openings (not shown) are provided in the plate 38 for clearing the ram 52, as well as a pair of rods 56 and 58 reciprocable with the ram 52. A triangular plate 60 (Fig. 12) rigid to the ram 52 for reciprocation therewith, rotatably receives the two rods 56 and 58. As seen in Fig. 3, rod 58 is provided with a pair of annular shoulders 62 embracing the plate 60, so that the rod 58 will rotate freely within plate 60 but not reciprocate vertically with respect thereto. Similar shoulders are provided on the rod 56, one of which is seen in Fig. 12 and designated by the numeral 64.

A partially toothed gear 66 is mounted on the ram 52 for free rotation about its vertical axis of reciprocation and held against movement along the ram 52 longitudinally of the latter by opposed collars 68 and 70 rigid to the ram 52. Gear 66 is provided with a radial stub shaft 72 serving as the axle for a wheel 74, and a bevel gear 76 rotatable on the shaft 72 is rigidly attached to wheel 74 for rotation therewith.

A second bevel gear 78 meshes with gear 76 and with a third bevel gear 80 at all times, gear 78 being freely rotatable on the ram 52 but held against vertical reciprocation relative to the ram 52 by collar 68 and a collar 82 rigid to ram 52 between gear 78 and plate 60. Gear 80 is keyed or otherwise affixed to the rod 56 for rotation therewith. Rod 58 is likewise provided with a gear 84 attached to rod 58 for rotation therewith and in constant mesh with the gear 66. It is noted that all of the gears 66, 78, 80 and 84 are disposed beneath the plate 60 and that the same all move to the dotted line position shown in Fig. 3 along with plate 60, shaft 72, gear 76 and wheel 74 when the piston 46 is forced to the lowermost end of its path of travel, thereby shifting the ram 52 and the two rods 56 and 58 downwardly to the lowermost ends of their paths of travel.

Gears 86 and 88 rotatably carried by the plate 38 and, therefore, held against vertical movement, are secured to rods 56 and 58 respectively for rotation therewith and, to the end that the rods 56 and 58 may reciprocate freely with respect to their gears 86 and 88 yet be rotated thereby, flat faces 90 and 92 respectively are provided thereon as seen in Figs. 3 and 6.

The upturned flange 40 rotatably receives a pair of shafts 94 and 96 having gears 98 and 100 thereon which mesh with gears 86 and 88 respectively. Shaft 96 is provided with a cable-receiving sheave 102 and for purposes hereinafter to be made clear, shaft 96 is reciprocable longitudinally thereof within the flange 40 and within the sheave 102 and, therefore, any suitable means such as shown in Fig. 6, may be provided to attach the sheave 102 to the shaft 96 for rotation with the latter. The shifting of the shaft 96 may take place upon lowering of the rod 58 to the dotted line position shown in Fig. 3, thereby positioning the gear 100 to the diametrically opposite side of the gear 88 as seen by dotted lines in Fig. 1.

Figure 9:
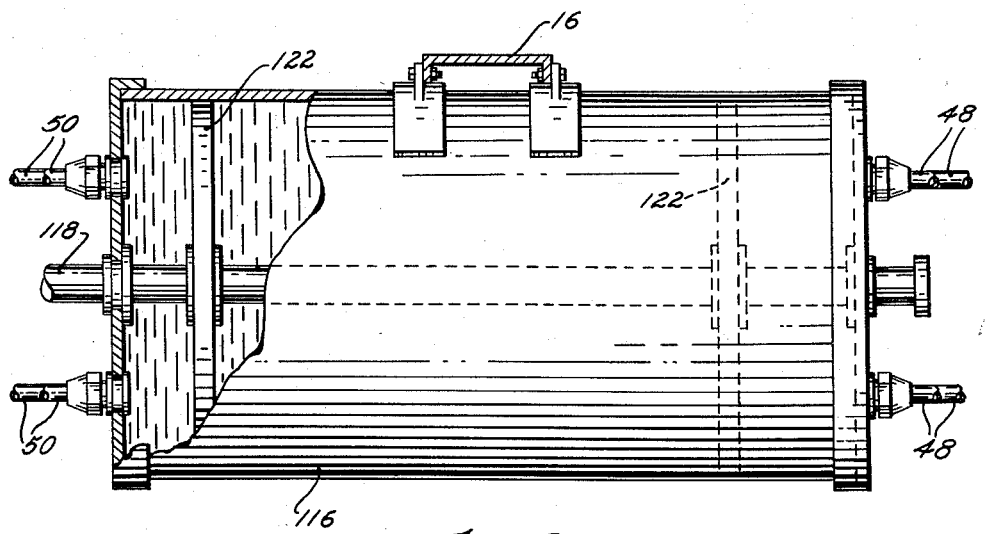
Fig. 9 is an enlarged, elevational view taken on line IX—IX of Fig. 1, parts being broken away for clearness.

Referring now to Figs. 1, 8 and 9, the hydraulic control that is operably coupled with the four cylinders 44, includes a pair of end-to-end pumps 104 and 106 adjacent the engine 22 and having a common impeller shaft 107 driven from the crank shaft of the engine 22 through belt and pulley means 108. Pump 104 communicates with one end of a cylinder 110 (Figs. 1 and 8) through a fluid line 112 and pump 106 communicates with the opposite end of cylinder 110 by a fluid line 114.

A second cylinder 116 forming a part of the hydraulic system in tandem relationship to the cylinder 110, is coupled at one end thereof with the cylinders 44 through the lines 48 and at the opposite end of cylinder 116 through the medium of lines 50.

Cylinders 110 and 116 are provided with a common piston shaft 118 upon which their pistons 120 and 122 respectively are rigidly mounted. Reciprocation of the shaft 118 slides a gear 124 along propeller shaft 24 into mesh with gears 126 and 128, it being understood that gear 124 is splined or otherwise attached to the shaft 24 for rotation therewith. A laterally extending arm 130 on the shaft 118 rotatably receives the gear 124.

A pair of spaced, longitudinally-extending shafts 132 and 134 rotatably carried by the chassis frame 16 are operably coupled with stub shafts 136 and 138 respectively. Intermeshing gears 140 couple the shafts 132 and 136 and the shafts 94 of the two units 30 and 36 are operably connected with the shaft 132 by intermeshing gears 142 and 144 respectively. Similarly, the shaft 134 is operably coupled with the shafts 94 of units 34 and 32 by intermeshing gears 146 and 148 respectively. Gears 126 and 128 are rigid to shafts 136 and 138 respectively as seen in Figure 1.

A sleeve 150 splined to the shaft 134 for rotation therewith, but reciprocable therealong, is provided with opposed gears 152 and 154, each adapted to mesh with gear 156 on the outermost end of shaft 138. Sleeve 150 is reciprocated along shaft 134 upon swinging of a 2-part extensible arm 158, pivotally interconnected to frame 16 and to sleeve 150.

Pumps 104 and 106 are controlled by valve arms 160 and 162 respectively through the medium of a cable 164 that is connected to a manually operated pull-knob 166 located adjacent the driver's seat, for example, on dashboard 168 as seen in Fig. 2.

Valve arms 160 and 162 are operated by pulling cable 164 and are set in a predetermined manner whereby pumps 104 and 106 may be selectively and separately placed into operation. Thus when control knob 166 is at its innermost position neither pump operates, when it is pulled to the intermediate position shown by the dotted lines of Fig. 2 pump 106 alone operates to deliver fluid to the front of cylinder 110 through line 114 and when knob 166 is pulled to its outermost position as shown in Fig. 2 pump 106 is rendered ineffective and pump 104 alone is actuated to deliver fluid to the rear of cylinder 110 through line 112.

Figure 11:
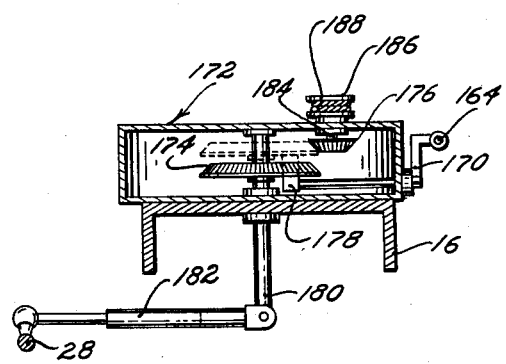
Fig. 11 is an enlarged, fragmentary, detailed, cross-sectional view taken on line XI—XI of Fig. 1, parts being broken away for clearness.

Cable 164 is also connected with a crank 170 (Figs. 1 and 11) forming a part of a gear box 172 mounted on the frame 16 adjacent the tie rod 28. Box 172 contains a pair of bevel gears 174 and 176 adapted to intermesh upon actuation of crank 170 by virtue of the fact that the latter is provided with a rotatable cam 178 which shifts the gear 174 upwardly along shaft 180 into mesh with gear 176. Gear 174 is mounted on shaft 180 for rotation therewith and the latter is in turn pivotally coupled with tie rod 28 by an extensible arm 182. Thus, when the tie rod 28 is reciprocated through the steering wheel of the automobile to thereby swing the arm 182, shaft 180 is oscillated to in turn drive the gear 176 when gear 174 is in mesh therewith.

Gear 176 is rigid to a shaft 184 rotatably carried by the gear box 172 and a cable sheave 186 is rigid to the shaft 184 exteriorly of the gear box 172.

A cable 188 is coiled about all four sleeves 102, as well as the sheave 186 and suitably affixed thereto, there being a plurality of pulleys 190 carried by the frame 16 around which the cable 188 is trained in the manner illustrated by Figure 1.

As above indicated, the gears 100 for the units 34 and 36 remain at all times in the position illustrated in Figure 1, whereas the shafts 96 for the units 30 and 32, reciprocate within their sheaves 102 and corresponding flanges 40, to change the position of the corresponding gear 100 relative to the underlying gear 88. Such changing of the position of the gears 100 for units 30 and 32, is effected by pulling outwardly on control knob 192 (Fig. 2) to exert a pull on cable 194. This swings cranks 196 and 198 for units 30 and 32 respectively, to force the corresponding shafts 96 outwardly to the dotted line position shown in Figure 1. It is to be noted that the two cranks 196 and 198 are swingable on the frame 16, are pivotally connected to the corresponding shafts 96, and spring-loaded to the full-line position shown in Figure 1.

The extent of protuberance of the rams 52 beyond their cylinders 44, necessary to raise the assemblies 18 and 20 off the ground and, therefore, cause the chassis 14 to be supported solely by wheels 74, is lessened if the wheels of the assemblies 18 and 20 are held against downward sagging during the lifting operation by units 30, 32, 34 and 36. To this end, as seen in Figs. 1 and 10, there is provided a locking device for each of the four wheels respectively of the assemblies 18 and 20.

A tube 200 and a rack 202 pivotally interconnect frame 16 and axle 204 adjacent spring 206. In this connection, it is to be understood that springs and axles of automotive vehicles vary considerably and, therefore, these elements as shown in Fig. 10 are for illustrative purposes only. In any event, it is seen that tube 200 telescopically receives rack 202 and is provided with a clearance opening 208 for hook 210 that is engageable through the opening 208 with teeth 212 of rack 202.

Figure 10:
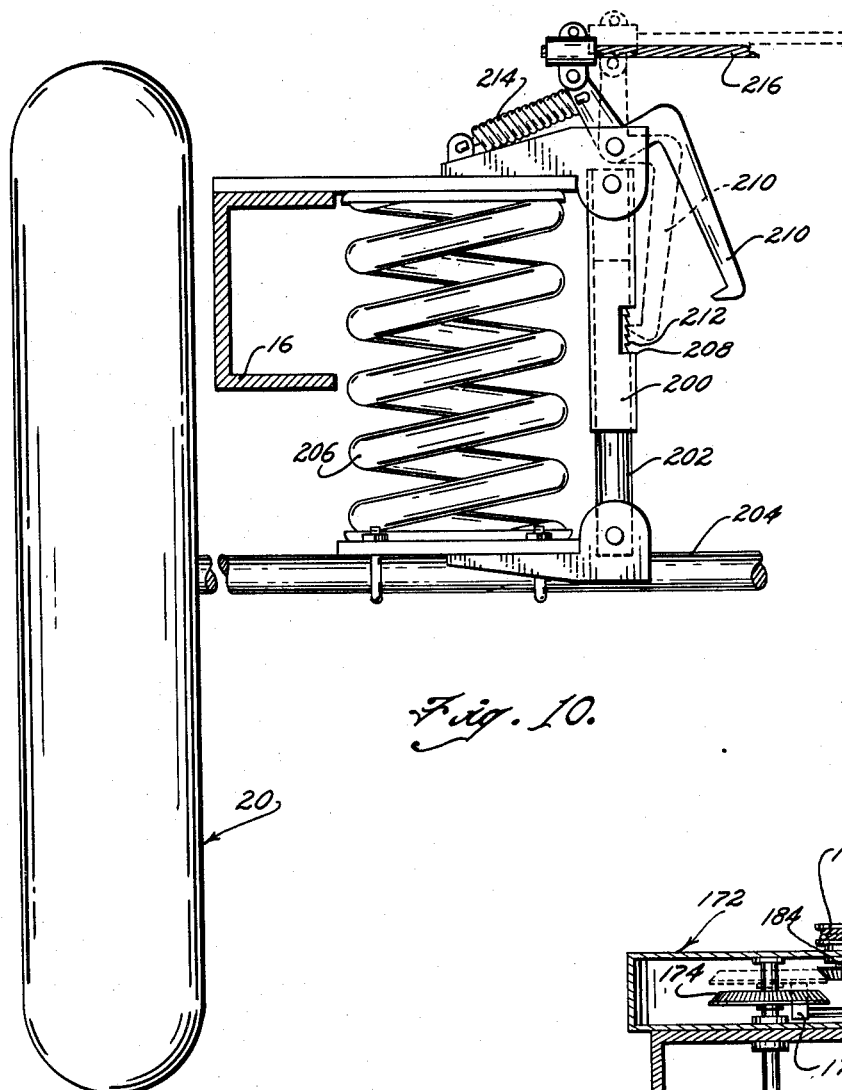
Fig. 10 is an enlarged, fragmentary, detailed, cross-sectional view taken on line X—X of Fig. 1.

Hook 210 is swingably secured to the frame 16 above the tube 200 and is held in the full-line position shown by Fig. 10 through the medium of a spring 214. The four hooks 210 are swung simultaneously to a position engaging their corresponding teeth 212 through the medium of a cable 216, together with proper guide pulleys as shown in Figure 1, cable 216 being operably connected with pull knob 218 adjacent the dash panel 168.

Normally, the chassis 16 is supported by the assemblies 18 and 20 and the units 30, 32, 34 and 36 are all retracted to the full-line position shown in Fig. 3 with the wheels 74 preferably in alignment with the normal path of travel of the vehicle as shown by full lines in Figure 1. When it is desired to move the vehicle laterally to its normal path of travel, the operator first pulls outwardly on the control 218, thereby exerting a pull on the cable 216, swinging all of the hooks 210 to the dotted-line position shown in Fig. 10, connecting the axles of assemblies 18 and 20 with the frame 16 so that the wheels of assemblies 18 and 20 do not sag downwardly during the lifting operation.

Thereupon, the operator pulls outwardly on control knob 166 to a position intermediate the ends of its path of travel as shown by dotted lines in Fig. 2, exerting a pull on cable 164. This actuates crank 170 and, therefore, cam 178 to shift gear 174 upwardly into mesh with gear 176. Pulling on cable 164 also swings arms 160 and 162 to the intermediate position illustrated by dotted lines in Figure 1, thereby rendering pump 106 effective, while engine 22 continues to operate to pump hydraulic fluid into cylinder 110 via line 114. Swinging of the arm 160 for pump 104 has no effect on the latter and, therefore, the fluid emanating from the cylinder 110 is returned to the pump 104 through line 112.

Shifting of the piston 120 to the dotted-line position shown in Fig. 8, moves the shaft 118 rearwardly carrying the piston 122 therewith to the position shown by dotted lines in Fig. 9. Fluid emanating from the cylinder 116 is forced into all four cylinders 44 above their pistons 46 by way of lines 48 and the fluid emanating from the cylinders 44 beneath the pistons 46, is returned to the cylinder 116 by way of lines 50.

As the pistons 46 and, therefore, rams 52, descend, the chassis 14 is raised as soon as wheels 74 come into engagement with the ground and when the pistons 46 reach the lower ends of their paths of travel, the vehicle is supported entirely by the wheels 74, the assemblies 18 and 20 having been raised out of engagement with the ground.

As shown by dotted lines in Fig. 3, when the wheels 74 are thus lowered, the five gears 66, 76, 78, 80 and 84, as well as the axles 72 and plates 60, are spaced from the plates 38 and the two rods 56 and 58 are likewise in a position depending from the plate 38. Consequently, by virtue of the fact that cam 178 has established an operable connection between the steering mechanism of the automobile and the wheels 74, the latter can be swung about the vertical axes of the rams 52 through use of the automobile steering wheel. Rotation of such steering wheel reciprocates the tie rod 28, thereby swinging the extensible arm 182 and rotating shaft 180, as well as gear 174 operably connected therewith. This imparts rotative motion to the gear 176 and the sheave 186, both of which are fixed to shaft 184.

Rotation of sheave 186 operates cable 188 to rotate the four sheaves 102 and, therefore, the corresponding shafts 96. Wheels 74 are consequently turned or steered from shafts 96 through gears 100 and 88, rods 58 and gears 84 and 66. As the axles 72 swing about the rams 52 as axes therefor, and as wheels 74 and gears 76 rotate about the axles 72, the said gears 76 rotate with respect to gears 78.

It is clear that through use of the steering mechanism of the automobile, wheels 74 may be swung substantially 180°. Thus, by way of example, when the wheels 74 of units 34 and 36 are in the dotted-line position shown in Figure 1, and when wheels 74 of units 30 and 32 are in the dotted-line position indicated by the designation A in Figure 1, the vehicle may be moved obliquely to one side and to the rear when the automobile is in a forward gear for example, or forwardly and to one side if the operator chooses to place the automobile in reverse.

When the shaft 118 is shifted to a vehicle-lifting position as shown by dotted lines in Figure 1, gear 124 is moved into meshing relationship with gears 126 and 128. Consequently, wheels 74 are driven from the engine 22 through shaft 24, gears 124, 126 and 128, shafts 136 and 138, gears 140 to drive shafts 132, and gears 156 and 152 to drive shaft 134. The wheels 74 of units 30 and 36 are driven from shaft 132 through gears 142 and 144 respectively and the wheels 74 of units 32 and 34 are driven from shaft 134 through gears 148 and 146 respectively. This drives all four shafts 94, the gears 98 thereon, gears 86, rods 56, gears 80, 78 and 76, and consequently, the wheels 74.

If, however, it is desired to move the vehicle in a circular path of travel about a central vertical axis therethrough, the operator pulls upon the control knob 192 after elevating the vehicle and prior to operation of shaft 24 or the steering mechanism of the automobile. This exerts a pull on cable 194 to swing the two cranks 196 and 198 against the action of their springs to the dotted line position shown in Figure 1. Such swinging of the cranks 196 and 198 shifts the corresponding shafts 96 for units 30 and 32, outwardly to thereby move the gears 100 diametrically with respect to underlying gears 88 and into mesh with the gears 88 on the opposite side of corresponding rods 58. Cable 194 is also attached to extensible arm 158 and, therefore, when control 192 is pulled outwardly, sleeve 150 is shifted to a position bringing gear 154 into mesh with gear 156, thereby rotating the wheels 74 of units 32 and 34 in the opposite direction.

Consequently, when the tie rod 28 is actuated in one direction, wheels 74 of units 34 and 36 are swung to the dotted line position shown in Figure 1, but the wheels 74 of units 30 and 32 are each shifted to position B in Figure 1. With the four wheels 74 thus positioned, rotation of the shaft 24 causes the vehicle to revolve in a circle, permitting the operator for example, to completely reverse the normal path of travel of the vehicle.

When the gears 100 for units 30 and 32 are shifted outwardly for the reasons just above described, it is necessary that the steering wheel be turned in only one direction since otherwise, the wheels 74 would not be positioned properly to permit use thereof in moving the vehicle through shaft 24. Accordingly, as cable 194 is actuated, it also controls a swingable L-shaped lever 220 to the dotted line position shown in Figure 1. Lever 220 is swingable on the frame 16 and connected with the cable 194. It is provided with a bifurcated, outermost end 222 that embraces the cable 188 when in the dotted line position shown in Figure 1 within the path of travel of a stop 224 on cable 188. This permits movement of the cable 188 in but one direction through operation of the steering mechanism of the automobile and, therefore, the tie rod 28 and associated parts, including the gear box 172.

Prior to lowering of the vehicle onto the wheels of assemblies 18 and 20, the control 192 must be pushed inwardly so as to retract the shafts 96 of units 30 and 32 and to return the gears 100 thereof to the position shown in Fig. 3. This also releases the crank 220 with respect to cable 188. Thereupon, control 166 is pulled to the outermost end of its path of travel as shown by dotted lines in Fig. 2, swinging arm 162 to a neutral position and arm 160 to a position for placing the pump 104 into operation.

Fluid is forced into cylinder 110 by pump 104 through line 112 and fluid flows from the cylinder 110 to pump 106 by way of line 114. This shifts the shaft 118 to the full-line position shown in Figure 1, releasing the operable connection between gears 124, 126 and 128 and forcing fluid from the cylinder 116 to the cylinders 44 by way of lines 50. Fluid flows from the cylinders 44 to the cylinder 116 by way of lines 48. Thereupon, control 166 is pushed inwardly to the full-line position shown in Fig. 2 and spring 226 returns the arms 160 and 162 to the neutral position shown by full lines in Figure 1.

Finally, the operator forces the control 218 inwardly and springs 214 release the hooks 210.

Having thus described the invention what is claimed as new and desired to be secured by Letters Patent is:

1. In an automotive vehicle having a chassis, a pair of wheel and axle assemblies normally supporting the chassis, and a prime mover carried by the chassis for driving one of said assemblies, the other of said assemblies being provided with steering mechanism, the improvement comprising a plurality of lifting units mounted on said chassis and each including a double-acting, fluid, piston and cylinder device having a vertically reciprocable ram and a gear axially fixed and rotatably mounted on the ram for swinging movement about the axis of reciprocation of the latter, a horizontal shaft rigid to said gear, and a wheel rotatable on said shaft; a pair of intermeshing devices for each unit respectively, one of the devices being axially fixed and rotatably mounted on the corresponding ram for reciprocation therewith, the other device being secured to the wheel of the corresponding unit for rotation therewith; means for operably connecting said prime mover with said one device of each of said units to rotate the same about its respective ram and thereby rotate said other device about its respective shaft and thereby move the vehicle when the rams are lowered to a position raising the chassis, thereby supporting the latter by the wheels of said units independently of said assemblies; and means operably connecting said mechanism with the gears to swing the latter and the wheels of said units to thereby guide the vehicle when the latter is moved by the wheels of said units through the power of said prime mover.

2. In an automotive vehicle having a chassis, a pair of wheel and axle assemblies normally supporting the chassis, and a prime mover carried by the chassis for driving one of said assemblies, the other of said assemblies being provided with steering mechanism, the improvement comprising a plurality of lifting units mounted on said chassis and each including a double-acting, fluid, piston and cylinder device having a vertically reciprocable ram, a gear axially fixed and rotatably mounted on the ram, a radial shaft carried by said gear, and a wheel rotatably mounted on said shaft for swinging movement about the axis of reciprocation of the ram; means operably connecting said prime mover with the wheels of said units to rotate the same when the rams are lowered to a position raising the chassis, thereby supporting the latter by the wheels of said units independently of said assemblies; and means operably connecting said mechanism with said gear whereby to swing the wheels of said units and thereby guide the vehicle when the latter is moved by the wheels of said units through the power of said prime mover.

3. In an automotive vehicle having a chassis, a pair of wheel and axle assemblies normally supporting the chassis, and a prime mover carried by the chassis for driving one of said assemblies, the other of said assemblies being provided with steering mechanism, the improvement comprising a plurality of lifting units mounted on said chassis and each including a double-acting, fluid, piston and cylinder device having a vertically reciprocable ram, a gear axially fixed and rotatably mounted on the ram, a radial shaft carried by said gear, and a wheel rotatably mounted on said shaft for swinging movement about the axis of reciprocation of the ram; means operably connecting said prime mover with the wheels of said units to rotate the same and thereby move the vehicle when the rams are lowered to a position raising the chassis thereby supporting the latter by the wheels of said units independently of said assemblies, said means including a pair of intermeshed devices for each unit respectively, one of the devices being axially fixed and rotatably mounted on the corresponding ram for reciprocation therewith, the other device being secured to the wheel of the corresponding unit for rotation therewith; and means operably connecting said mechanism with said gear whereby to swing the wheels of said units and thereby guide the vehicle when the latter is moved by the wheels of said units through the power of said prime mover.

References Cited in the file of this patent

UNITED STATES PATENTS

| | | |
|---|---|---|
| 1,703,070 | Barshell | Feb. 19, 1929 |
| 1,742,636 | Collins | Jan. 7, 1930 |
| 1,827,457 | Branson | Oct. 13, 1931 |
| 1,940,724 | Mizzy et al. | Dec. 26, 1933 |
| 2,024,844 | Berman | Dec. 17, 1935 |

FOREIGN PATENTS

| | | |
|---|---|---|
| 104,252 | Great Britain | Mar. 1, 1917 |
| 451,813 | Great Britain | Aug. 12, 1936 |